United States Patent [19]

Singer

[11] Patent Number: 5,399,369
[45] Date of Patent: Mar. 21, 1995

[54] ACCELERATED SUPERCRITICAL FLUID EXTRACTION PROCESS

[75] Inventor: Norman S. Singer, Highland Park, Ill.

[73] Assignee: The NutraSweet Company, Deerfield, Ill.

[21] Appl. No.: 60,354

[22] Filed: May 11, 1993

Related U.S. Application Data

[63] Continuation-in-part of Ser. No. 883,081, May 15, 1992, abandoned.

[51] Int. Cl.⁶ ............................................. C11B 1/00
[52] U.S. Cl. ................................ 426/417; 426/285; 426/425; 426/429; 554/8
[58] Field of Search ............... 426/614, 425, 429, 417, 426/422, 285, 453, 456, 457; 554/8

[56] References Cited

U.S. PATENT DOCUMENTS

| | | | |
|---|---|---|---|
| 4,234,619 | 11/1980 | Yano et al. | 426/614 |
| 4,495,207 | 11/1985 | Christianson et al. | 426/614 |
| 5,026,565 | 6/1991 | McLachlan et al. | 426/241 |
| 5,097,017 | 3/1992 | Konwinski | 426/285 |

FOREIGN PATENT DOCUMENTS

| | | | |
|---|---|---|---|
| 59-135847 | 8/1984 | Japan. | |
| 59-37060 | 9/1984 | Japan | 426/614 |
| 2-283263 | 11/1990 | Japan | 426/614 |
| WO92/22220 | 12/1992 | WIPO | 426/614 |

OTHER PUBLICATIONS

Perry et al. 1973. Chemical Engineers' Handbook. McGraw-Hill Book Co, New York. 5th Ed, pp. 8–61 to 8–63 and 20–31.

*Primary Examiner*—Donald E. Czaja
*Assistant Examiner*—Anthony Weier
*Attorney, Agent, or Firm*—Marshall, O'Toole, Gerstein, Murray & Borun

[57] ABSTRACT

The present invention provides improvements in supercritical fluid extraction of particulate egg substrates by forming the substrate into porous solid particles characterized by a number weighted mean particle size ranging from about 0.5 millimeters to about 3 millimeters and by a tapped bulk density of from about 0.2 to about 0.5 grams per milliliter prior to subjecting the substrate to extraction under supercritical conditions.

7 Claims, No Drawings

ACCELERATED SUPERCRITICAL FLUID EXTRACTION PROCESS

This application is a continuation-in-part of U.S. patent application Ser. No. 07/883,081, filed May 15, 1992, now abandoned.

BACKGROUND OF THE INVENTION

The present invention relates to an improved supercritical fluid extraction process. Specifically, the process provides improved methods for extraction of solutes from powdered egg substrates wherein the high costs of supercritical fluid extraction are reduced by increasing the flow rate of the supercritical fluid through the substrate, without sacrifice of solute mass transfer.

Supercritical fluid extraction is a very attractive process for removing either valuable or unwanted components from a wide variety of substrates. Supercritical fluid extraction is desirable because it leaves no solvent residues in either the substrate or the extract, does not create "still-bottoms" or stack emissions and is friendly to the environment.

Supercritical fluid extraction is rarely practiced on a large commercial scale with the decaffeination of coffees and teas, the extraction of hops essence and some other flavor extractions as notable exceptions. The major obstacle to large scale supercritical fluid extraction processes is the relatively high cost of those processes which is due in pan to low solubility of many target solutes in common supercritical fluids, prohibitive capital expenses and the protracted time which is required for the extraction to be accomplished.

The extraction time is dependent on the solubility of the solute, transfer of the solvent into the particle of substrate, transfer of the solute-laden solvent out of the substrate particle, and the flow rate at which the supercritical fluid can be pumped through the bed of substrate. Powdered materials in particular are subject to variable extraction rates in supercritical fluid extraction processes because powdered substrates tend to suffer from channelling and compaction of the substrate particles such as against the discharge plate of the supercritical fluid extraction pressure vessel.

Of interest to the present application is the process by which egg solids including egg yolk are processed by spray drying to produce a dried powder which can be further processed or can be reconstituted in the production of food products. Spray dried egg particles are characterized by mean particle sizes of about 0.1 millimeters, a relatively low degree of porosity and a relatively high bulk density. Such spray dried particles tend to suffer from compaction and channelling and provide resistance to fluid flow during supercritical fluid extraction.

Accordingly, there exists a desire in the art for a means of increasing the flow rate of supercritical fluid through a bed of substrate in such a way as to minimize reductions of solute mass transfer.

SUMMARY OF THE INVENTION

The present invention provides an improvement in processes of extracting a solute from a particulate egg substrate, the improvement comprising forming said substrate into porous solid particles characterized by a number weighted mean particle size ranging from about 0.5 millimeters to about 3 millimeters and by a tapped bulk density of from about 0.2 to about 0.5 grams per milliliter prior to subjecting the substrate to extraction under supercritical conditions. It has been found that porous egg particles characterized by larger particle sizes, non-spheroidal shapes, and smaller bulk densities than those conventionally produced by spray drying exhibit improved supercritical fluid extraction characteristics compared with egg particles produced by spray drying which are typically characterized by spheroidal shapes, number weighted mean particle sizes of about 0.1 millimeter and which have tapped bulk densities of about 0.55 g/mL or higher.

According to the present invention egg solids including egg yolk are formed into a mass of large porous particles characterized by number weighted mean particle sizes ranging from about 0.5 millimeters to about 3 millimeters and by having reduced tapped bulk densities of from about 0.2 to about 0.5 grams per milliliter by methods such as drum drying. It has been discovered that the use of drum drying techniques and most preferably vacuum drum drying results in egg particles which are larger than those prepared by spray drying techniques but are characterized by lower bulk densities for a given particle size than those prepared by spray drying processes. The resulting particles are not only larger but are generally non-spheroidal in shape and are characterized by a highly porous nature that manifests itself in reduced density. By substantially non-spheroidal is meant having a shape with at least one dimension of length, width of height which is at least twice the length of one or more of the other dimensions. Flakes which have a thickness which is one-fifth to one-tenth or less the dimension of length or width of the particle are substantially non-spheroidal. The porous nature of egg particles so prepared provides for intimate contact of the supercritical extraction fluid with the substrate to more efficiently extract solutes such as fat and cholesterol. The large size, non-spheroidal shape, reduced bulk density and reduced compressibility of the particles also prevent compaction of the substrate. By preventing compaction of the substrate particles, the flow rate of the supercritical fluid through a bed of substrate can be increased when compared to supercritical fluid extraction processes conducted on smaller spheroidal particles having relatively greater bulk densities such as those produced by spray drying egg particles.

The present invention avoids loss of solute mass transfer by providing improved porosity. This finding is surprising in that conventional wisdom would argue against increasing the size of the particle to be extracted, as this would decrease the surface area exposed to the solvent. In addition, it would argue against reducing the bulk density of the substrate as this would reduce the weight of substrate that could be loaded into the pressure column. Surprisingly, it has been found that the efficiency gains which can be obtained by increasing particle sizes and reducing bulk densities are far greater than the predicted losses. In contrast to many types of supercritical extraction, the present invention relates to methods of extracting unwanted materials from a substrate to provide a desirable food material as a residue.

DETAILED DESCRIPTION OF THE INVENTION

In practicing the methods of the present invention a porous solid particulate egg substrate from which it is desired to extract a solute such as fat or cholesterol is subjected to a supercritical fluid extraction process wherein the flow rate of the supercritical fluid through the substrate is increased compared to the flow rate attainable by flowing the supercritical fluid through conventional spray dried egg powder. The improved method increases the speed and efficiency of extraction with no sacrifice of solute mass transfer.

While not mandatory, it is preferred that this structuring be accomplished during, or in connection with, dehydration of the substrate prior to supercritical fluid extraction. Alternatively, a powdered substrate can be transformed into a particulate by any number of ways known to the art, such as, for example, agglomerating.

However produced, the resulting egg particulates should be generally non-spheroidal and characterized by a number weighted mean particle size ranging from about 0.5 to about 3 millimeters with mean particle sizes ranging from about 0.5 to about 1.5 millimeters being preferred. It has been found that egg particles in this size range increase the flow rate at which supercritical fluid solvent can be passed through a bed of substrate while maintaining a high rate of solvent transfer into and then out of the substrate particles. In addition, the particles themselves should be relatively porous in order to facilitate transfer of supercritical solvent into the substrate particles and transfer of solute-laden solvent out of the substrate particles. This elevated degree of porosity is related to a decrease in bulk density for any given particle size. Accordingly, the egg particles produced by drum drying or other means should be characterized by a tapped bulk density of from about 0.2 to about 0.5 grams per milliliter with tapped bulk densities of from about 0.2 to about 0.4 grams per milliliter being preferred.

According to one aspect of the invention, fluid egg yolk is dried in the form of flakes by vacuum drum drying and then subjected to a supercritical fluid extraction process with supercritical $CO_2$ where a major portion (>90%) of the neutral lipids and cholesterol (the solutes) are extracted. The resulting low fat/cholesterol dry egg yolk is then combined with water and egg white to make a low cholesterol, low fat "whole egg" product. Antioxidants such as Vitamin E can be added to the egg yolk prior to drying to inhibit oxidation of the egg yolk.

While egg yolk is used herein as the exemplary material (substrate), the finding which is at the core of the invention is sufficiently basic to relate to a variety of extractions which will benefit from the practice of this discovery including, oil and unwanted aroma and aroma precursors from soybeans or surimi (fish puree), pharmaceutically active materials such as steroids and prostaglandins from animal tissues, residual lipids from milk or whey, aromatic materials from fruits and other botanical materials, unwanted aromatic materials from gelatin, pectin, and other gums.

Supercritical fluids useful according to the invention can be any solvent that will solubilize the solute under supercritical conditions. Suitable supercritical fluids include xenon, butane, propane, ethane, ethylene, silane, nitrous oxide and carbon dioxide. In the case where neutral lipids (fat) and cholesterol are the solutes to be extracted from egg carbon dioxide is the preferred supercritical solvent.

Of interest to the present invention is the disclosure of an improved method for separating a solute from a supercritical fluid described in co-owned and copending U.S. patent application Ser. No. 08/060355 filed May 11, 1993 which is hereby incorporated by reference.

The following examples illustrate the practice of the invention but should not be taken as limiting of the scope of the invention.

EXAMPLE 1

According to this example, supercritical fluid extraction was carried out on egg yolk powder produced by spray drying egg yolk with 0.06 weight percent natural mixed tocopherols (SUSTAIN, U.O.P., Des Plaines, Ill.). Specifically, five pounds of spray dried egg yolk products were charged into a supercritical fluid extraction vessel, and subjected to extraction by supercritical $CO_2$ at a pressure of 4,950 psi at 50° C. and a flow rate of 55 pounds/hour of supercritical $CO_2$. The supercritical $CO_2$ was passed through two separators wherein the pressure was reduced to 1,300 psi and the extracted oil and cholesterol were separated from the supercritical $CO_2$. The purified supercritical $CO_2$ was cooled, repressurized and returned to the extraction vessel and the process was continued until the weight of the supercritical $CO_2$ which had been passed through the column was equal to 100 times the weight of the charged egg yolk powder.

Upon opening of the column, (after appropriate depressurization) much of the extracted product was seen to be compacted into dense regions, sometimes spanning the cross-sectional area of the column. This material persisted in chunk form after removal from the column. When these were broken apart, it was evident, from the darker color and more oily nature that the mass within the chunk had been less-effectively extracted than had the surrounding material.

| ANALYSES: | |
| --- | --- |
| Particle Size (average diameter, microns) | 100 |
| Bulk Density, packed (grams/ml) | 0.62 |
| Cholesterol (mg/100 grams) | 351 |

EXAMPLE 2

Five pounds of egg yolk particles were prepared by first deaerating egg yolk in a vacuum chamber at 29 inches of Mercury vacuum for 15 minutes at 38°-41° C. The egg yolk was then subjected to vacuum drum drying on a 2 square foot vacuum drum drier (Blaw Knox Food and Chemical Equipment, Buffalo, N.Y.) operated at approximately 25-28 inches of Mercury vacuum, supplied with steam at 3-7 psig pressure, and fed with egg yolks preheated to 27°-35° C. After drying, the yolks were cut on a D-6 Fitzmill (Fitzpatrick, Elmhurst, Ill.). The resulting egg flakes were then subjected to the same supercritical $CO_2$ extraction conditions as in Example 1 above wherein the weight of supercritical $CO_2$ passed through the column was equal to 100 times the weight of the charged egg yolk powder. When the column was opened, the extracted egg yolk material was not found to be compacted and was still free-flowing with no lumps observed.

| ANALYSES: | |
| --- | --- |
| Particle Size of Flake | |
| Diameter (mm) | 3 |
| Thickness (mm) | 1 |
| Bulk Density, packed (g/cc) | 0.36 |

| -continued |  |
| --- | --- |
| ANALYSES: |  |
| Cholesterol (mg/100 g) | 103 |

Comparison of the results of Examples 1 and 2 show that the differences in vacuum drum dried versus spray dried egg particles result in improved extraction efficiencies. Specifically, increasing particle size by approximately ten fold, while simultaneously decreasing the bulk density by about 40% resulted in extracted egg product having less than one-third the cholesterol level while at the same time producing a more uniformly extracted product.

EXAMPLE 3

According to this example, egg yolk flakes produced by vacuum drum drying according to the method of Example 2 were charged into a laboratory extraction apparatus, which was set up to permit controlled increases of the flow rate of supercritical $CO_2$. The flow rate of supercritical $CO_2$ was varied from about 10 to about 80 standard liters per minute with fresh charges of egg yolk flake to determine the amount of total lipid mass extracted at each flow rate by a quantity of supercritical $CO_2$ equal to 100 times the weight of the egg yolk to be extracted. The flow rate of about 10 standard liters per minute was selected because that rate had previously been found to be maximally obtainable for extraction of spray dried egg particles, while the extraction rate of about 80 standard liters per minute was the operational limit of the pump used in the experimental set-up. The results presented in Table 1 below show only minimal decreases (about 3%) in extraction efficiency with increasing solvent flow rates and demonstrate that the egg yolk particles prepared by vacuum drum drying according to the methods of the invention are capable of being efficiently extracted by supercritical fluids at significantly higher flow-rates than are particles prepared by conventional spray drying.

TABLE 1

| Flow Rate (Standard L/min.) | 9.9 | 53.5 | 78.5 |
| --- | --- | --- | --- |
| Lipid Extract (% orig. wt.) | 45 | 42.7 | 42.1 |

In the following examples, egg yolk flakes produced by vacuum drum drying according to the invention were compared with conventional spray dried egg particles obtained from Milton G. Waldbaum Co., (Wakefield, Nebr.) to determine their permeability to a supercritical fluid. Specifically, egg yolk material produced for these examples was first deaerated by holding in a vacuum chamber at 29 inches of Mercury vacuum for 15 minutes at 38°–41° C. and was then dried on a 2 square foot Blaw Knox vacuum drum drier operated at approximately 25–28 inches of Mercury vacuum, supplied with steam at 3–7 psig pressure, and fed with egg yolks preheated to 27°–35° C. After drying, the yolks were cut on a D-6 Fitzpatrick Fitzmill to produce flakes.

EXAMPLE 4

According to this example, particle size analysis was carried out on five samples of vacuum drum dried egg yolk flakes of varying moisture contents and bulk densities all of which comprised 3.5% by weight sorbitol and 0.06% by weight tocopherols (PRISTINE 180) as antioxidants. The same particle size analysis was also carried out on spray dried egg particles obtained from Milton G. Waldbaum Co., (Wakefield, Nebr.).

Specifically, a Dapple particle size analysis was conducted to determine the number weighted and volume weighted mean particle size distributions of the egg particles. Specifically, raw egg flakes or particles were sprinkled onto a non-reflective black background that contrasted well with the light egg flakes. Only clumps of egg particles that were very loose were broken up prior to analysis. The sample image was then captured with a television camera and PRISM VIEW TM particle size analysis software (Dapple Systems, Inc., Sunnyvale, Calif. and Analytical Vision, Inc., Raleigh, N.C.). The measured size was then calibrated from a captured image of a ruler. The final data used for analysis was taken from four frames in order to improve accuracy. The image was then converted into a binary plot and inverted for analysis to determine particle size and a distribution plot. In each case, a field representative of the entire sample was chosen and it was stipulated that a minimum of 1000 particles for each sample would be needed so that it was necessary to combine as many a four images in the PRISMCALC TM particle size analysis software (Analytical Vision, Inc.)

The size analysis results are shown in Table 2 below along with a determination of particle moisture according to a microwave moisture analyzer (CEM Corp., Indian Trail, N.C.). The number weighted average particle size is disclosed along with the size of the largest particle in the field.

TABLE 2

| Sample | Moisture | Largest Part ($\mu$) | Num. Wt. Mean ($\mu$) |
| --- | --- | --- | --- |
| Drum Dried A | 4.59% | 5305 | 1120 |
| Drum Dried B | 9.94 | 3600 | 1122 |
| Drum Dried C | 5.42 | 1789 | 559 |
| Drum Dried D | 3.73 | 2717 | 585 |
| Drum Dried E | 3.47 | 2549 | 569 |
| Spray Dry | 3.12 | 1161 | 123 |

The aerated and tapped densities of the spray-dried and vacuum drum dried particles were also determined according to the PT-E Powder Characteristics Test (Hosokawa Micro Corporation, Osaka, Japan) and are set out below in Table 3.

TABLE 3

| Sample | Tapped Bulk Density (g/mL) | Aerated Bulk Density (g/mL) |
| --- | --- | --- |
| Spray Dry | 0.55 | 0.33 |
| Drum Dried A | 0.49 | 0.35 |
| Drum Dried B | 0.44 | 0.32 |
| Drum Dried C | 0.28 | 0.22 |
| Drum Dried D | 0.23 | 0.18 |
| Drum Dried E | 0.23 | 0.19 |

EXAMPLE 5

According to this example, permeability measurements were made to determine the ease of gas passage through beds of the dried egg particles described in example 4. The permeability measurements were made according to the methods of Thomson, Storage of Particulate Solids, In Handbook of Powder Science and Technology pp. 365–463. edited by Fayed, M.E. and L. Otten, Van Norstrand Reinhold Co. N.Y. (1984); and of Jenike et al. Settlement of Powders in Vertical Channels Caused by Gas Escape. Trans. ASME. J. Applied Mechanics (E)39(4):863–868 (1972). Specifically, the egg particles to be tested were packed into a column which was tapped during the filling operation. The column bed height was measured and the pressure drop and flow velocity were measured while nitrogen gas was allowed to flow up through the bed from the bottom of the bed using a fritted glass column support as a gas diffuser. The gas flow rate was progressively increased until the column bed began to lift and move up the cylinder.

The flow rate and pressure drop were recorded just prior to the bed movement. Two different bed heights for each egg particle sample were run and the resulting bed height, flow rate and pressure drop were then used to calculate the permeability using a modified form of the D'Arcy equation set out below.

$$c = \frac{vh}{\Delta P}$$

Where v=superficial gas velocity (m/s), h=column bed height (m), $\Delta P$=pressure drop across the column (Pa) and c=permeability factor (m$^2$/ Pa-s). The greater the value for c, the higher flow rate required to cause the bed to move or compress.

The testing showed that only very low gas flow rates were required to cause the spray dried egg particles to flow up the column whereas the larger vacuum drum dried particles required a gas flow rate ten times higher for the column to be lifted. The pressure drop at the velocity required to lift the column bed was also higher for the spray dried material than for the dram dried material even though the flow rate was ten times less. The results shown in Tables 4 and 5 below show that permeability was an order of magnitude less for the spray dried powder than for the drum dried flakes.

TABLE 4

| Sample | Col. Height m | Sample Weight g | Flow Rate cm/s | ΔP Pa | Permeability m$^2$/Pa-s |
| --- | --- | --- | --- | --- | --- |
| Spray Dried | .156 | 107.8 | .012 | 1200 | 1.59 × 10$^{-8}$ |
| Drum Dried A | .160 | 98.5 | .242 | 800 | 4.84 × 10$^{-7}$ |
| Drum Dried B | .143 | 79.1 | .269 | 667 | 5.76 × 10$^{-7}$ |
| Drum Dried C | .147 | 51.7 | .110 | 800 | 2.01 × 10$^{-7}$ |
| Drum Dried D | .163 | 47.1 | .104 | 667 | 2.55 × 10$^{-7}$ |
| Drum Dried E | .175 | 50.6 | .131 | 800 | 2.86 × 10$^{-7}$ |
| Spray Dried | .210 | 145.1 | .014 | 1600 | 1.78 × 10$^{-8}$ |
| Drum Dried A | .225 | 138.5 | .269 | 1333 | 4.53 × 10$^{-7}$ |
| Drum Dried B | .190 | 105.1 | .250 | 667 | 7.13 × 10$^{-7}$ |
| Drum Dried C | .203 | 71.4 | .116 | 1200 | 1.97 × 10$^{-7}$ |
| Drum Dried D | .210 | 60.7 | .118 | 800 | 3.08 × 10$^{-7}$ |
| Drum Dried E | .253 | 73.1 | .158 | 933 | 4.29 × 10$^{-7}$ |

TABLE 5

| Sample | Num. Wt. Mean Particle Size (μ) | Tapped Bulk Density (g/mL) | Aerated Bulk Density (g/mL) | Permeability (m$^2$/pa-s) |
| --- | --- | --- | --- | --- |
| Spray Dried | 123 | 0.55 | 0.33 | 1.7 × 10$^{-8}$ |
| Drum Dried A | 1120 | 0.49 | 0.35 | 4.69 × 10$^{-7}$ |
| Drum Dried B | 1122 | 0.44 | 0.32 | 6.45 × 10$^{-7}$ |
| Drum Dried C | 559 | 0.28 | 0.22 | 1.99 × 10$^{-7}$ |
| Drum Dried D | 589 | 0.23 | 0.18 | 2.82 × 10$^{-7}$ |
| Drum Dried E | 569 | 0.23 | 0.19 | 3.58 × 10$^{-7}$ |

EXAMPLE 6

In this example drum dried and spray dried egg yolk particles were tested to determine flow characteristics of nitrogen gas flowing through a packed bed of the particles and the compressibility of the particles. Specifically, egg particles were packed into a 2.5 cm inner diameter column which utilized a sample adapter placed at the top of the bed to prevent the bed from moving up the column. Testing of the drum dried egg yolk particles observed no compression of the drum dried egg particles while testing of spray dried egg particles resulted in compression of the egg particles and a more rapid increase in pressure drop than observed with the drum dried flakes. Total net pressure drop for the bed packed with the spray dried egg particles was 12 mm Hg (at 0.035 cm/s) compared with pressure drops ranging from about 3 to 8 mm Hg at up to 0.18 cm/s for the beds packed with the larger, more porous drum dried egg particles.

EXAMPLE 7

According to this example, samples of spray dried and drum dried egg particles were subjected to extraction with supercritical $CO_2$ at various solvent flow rates. Specifically, vacuum drum dried egg yolks were prepared by drying egg yolks treated with 0.06% by weight tocopherols (PRISTINE 180) on a 9 square foot BLAW-KNOX brand vacuum drum drier with a vacuum of 28–29 inches of Mercury. Cutting was performed with a D-6 Fitzpatrick brand Fitzmill. The resulting products had a bulk density of 0.20–0.28 grams per milliliter. In each run, the solvent to feed ratio was 50:1 and the extraction was run at 50 C. and a pressure of 330 bar. The results shown in Table 6 below show that relatively minor increases in solvent throughput velocity resulted in inefficient cholesterol extraction and significant increases in pressure drop across the bed containing the spray dried egg particles. In the case of a superficial gas velocity of 2.7 cm/s for the spray dried egg the experiment was terminated because the bed compacted and flow was completely blocked. In contrast, equivalent and even higher supercritical $CO_2$ flow rates did not significantly reduce cholesterol extraction efficiency or increase the pressure drop across the column packed with the drum dried egg particles. This demonstrates the improvement obtained by use of porous egg particles characterized by particle sizes and bulk densities called for by the present invention.

TABLE 6

| Material | Superficial Velocity (cm/s) | Residual Cholesterol (mg/100 g) | Pressure Drop Across Bed (psi) |
| --- | --- | --- | --- |
| Spray Dried | 0.8 | 125 | 0* |
| Spray Dried | 1.6 | 482 | 50 |
| Spray Dried | 2.7 | n/a | n/a |
| Drum Dried | 0.6 | 130 | 0* |
| Drum Dried | 1.1 | 148 | 0* |
| Drum Dried | 1.6 | 145 | 0* |
| Drum Dried | 2.7 | 178 | 0* |
| Drum Dried | 3.8 | 161 | 100 |

*0 means too low to be measured.
n/a means experiment terminated because was blocked.

In similar embodiments, various substrates described herein are formed into porous solids and subjected to various supercritical solvents described herein to extract a particular solute(s) wherein the flow rate of the supercritical fluid through the bed of solute is increased when compared to the flow rate of the supercritical fluid through a powdered substrate. Accordingly, numerous modifications and variations in the practice of the invention are expected to occur to those skilled in the art upon consideration of the foregoing descriptions of the invention. Consequently, only such limitations should be placed upon the invention as appear in the following claims.

What is claimed is:

1. In a process of extracting a solute from a particulate egg substrate with supercritical fluid under supercritical conditions, the improvement comprising:

forming said substrate into porous, non-spherical, solid particles characterized by a number weighted mean particle size ranging from about 0.5 millimeters to about 3 millimeters and by a tapped bulk density of from about 0.2 to about 0.5 grams per milliliter prior to subjecting the substrate to extraction under supercritical conditions.

2. The improved process of claim 1 wherein the porous solid particles are produced by drum drying.

3. The improved process of claim 1 wherein the porous solid particles are characterized by a number weighted mean particle size ranging from about 0.5 to about 1.5 millimeters.

4. The improved process of claim 1 wherein the porous solid particles are characterized by a tapped bulk density of from about 0.2 to about 0.4 grains per milliliter.

5. The improved process of claim 1 wherein the substrate is dried egg yolk.

6. The improved process of claim 1 wherein the supercritical fluid is carbon dioxide.

7. The improved process of claim 1 wherein the solute to be extracted is selected from the group consisting of fat and cholesterol.

* * * * *

UNITED STATES PATENT AND TRADEMARK OFFICE
CERTIFICATE OF CORRECTION

PATENT NO. : 5,399,369

DATED : March 21, 1995

INVENTOR(S) : Norman S. Singer

It is certified that error appears in the above-identified patent and that said Letters Patent is hereby corrected as shown below:

Column 1, line 31, "pan" should be --part--.

Column 6, line 22, "a" should be --as--.

Column 7, line 32, "dram" should be --drum--.

Column 8, line 30, "50 C" should be --50°C--.

Column 10, line 7, "grains" should be --grams--.

Signed and Sealed this

Seventeenth Day of October, 1995

Attest:

BRUCE LEHMAN

Attesting Officer

Commissioner of Patents and Trademarks